(No Model.)

R. CLAYTON.
COVER FOR VESSELS, &c.

No. 561,764.        Patented June 9, 1896.

Witnesses:

Inventor:
Richard Clayton
by Henry Connett
His Attorney

UNITED STATES PATENT OFFICE.

RICHARD CLAYTON, OF SEDGLEY, ENGLAND.

COVER FOR VESSELS, &c.

SPECIFICATION forming part of Letters Patent No. 561,764, dated June 9, 1896.

Application filed February 24, 1896. Serial No. 580,336. (No model.)

*To all whom it may concern:*

Be it known that I, RICHARD CLAYTON, a subject of the Queen of Great Britain, residing in Sedgley, in the county of Stafford, England, have invented certain new and useful Improvements in Covers for Vessels or Utensils, of which the following is a specification.

This invention relates to covers for vessels, such as saucepans and the like, which are commonly employed in cooking; and the object is to so construct the cover that when properly seated on and covering the vessel it will provide a strainer for the contents of the vessel and permit the escape of steam therefrom, so that the contents of the vessel will not boil over. This cover will not require to be moved or raised in order that it may perform the functions above enumerated; but when in its normal position on an ordinary vessel with a plain top it will at all times be in position to serve as a strainer and to allow the steam to escape from the vessel.

Figure 1:
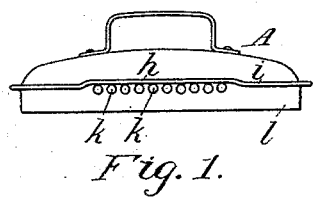
Figure 3:
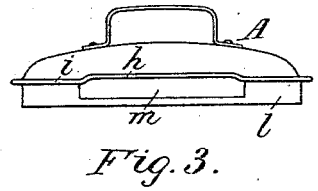
Figure 2:
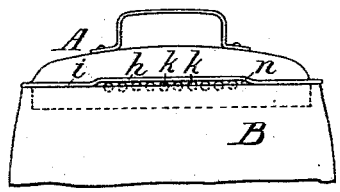
Figure 4:
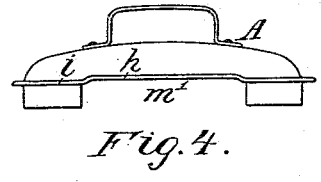
Figure 5:
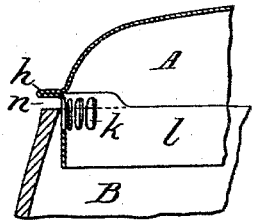

In the accompanying drawings, which illustrate several embodiments of my invention, Figure 1 is a side elevation of a cover constructed according to my invention; and Fig. 2 is a similar view of the cover, showing it in place on a saucepan or vessel. Figs. 3 and 4 are views similar to Fig. 1, illustrating other embodiments of the cover. Fig. 5 is a fragmentary sectional view of the cover and a part of the saucepan, drawn to a larger scale than the other views.

A represents the cover as a whole, and B in Figs. 2 and 5 the saucepan or other vessel to which the cover is adapted. The cover A may be of any suitable material. As here shown it is of sheet metal. The cover has a projecting flange $i$, which is designed to support the cover on the vessel or utensil A, and a pendent portion or flange $l$, which is designed to extend down into the open mouth of the vessel and prevent the cover from sliding off laterally. These features are common in covers.

In carrying out my invention I elevate a portion $h$ of the flange $i$ above the general level of the flange and form an aperture or apertures in the pendent portion $l$ beneath this elevated portion $h$ of the projecting supporting-flange, whereby when the cover is in place on the vessel B, as seen in Figs. 2 and 5, this aperture or some part of the same will be above the level of the top of the vessel, as clearly shown. In Figs. 1, 2, and 5 I have shown a series of small holes $k$ in the flange $l$, which holes project above the general level of the flange $i$, and in Fig. 3 an elongated aperture $m$, which extends above the general level of the flange $i$. In Fig. 4 the aperture is formed by cutting away the flange $l$ for a space about equal to the length of the elevated part $h$ of the projecting flange, thus forming an aperture $m'$. In this latter figure I have omitted, for the sake of clearness, the line representing the bottom of the flange $l$ at the point directly opposite the gap or aperture $m'$.

It will be seen by reference to Figs. 2 and 5 that when the cover A is in place on the vessel a space $n$ is formed or left between the top of the vessel and the elevated part $h$ of the projecting flange, and the upper portions of the apertures $k$ are opposite to such space, whereby said space $n$ communicates with the interior of the vessel, so that without raising the cover liquid may be poured from the vessel out through said apertures. This construction allows the cover to be held down firmly while the liquid is being poured out, and it also permits the escape of steam from the vessel. The holes or apertures exposed are also small enough to serve as a strainer, so that the liquid may be strained off while the more solid contents are retained in the vessel.

It will be obvious that the apertures under the elevated flange $h$, as formed in the constructions of Figs. 3 and 4, will serve a purpose like or similar to that of the construction of Figs. 1 and 2; but the constructions of Figs. 3 and 4 tend to weaken the flange $l$ somewhat more than that where small holes are employed, especially where the cover is made from sheet metal.

It will be noted that my improved construction is confined entirely to the cover A, and this cover may be used on any vessel into which the flange $l$ will properly fit. The top of the vessel may be perfectly plain. The part of the cover where the raised flange $h$ is situated may be placed anywhere desired about the rim at the mouth of the vessel— that is to say, if the vessel has a handle the cover A may be so placed that the flange $h$ will be in the proper position for pouring out the liquid contents of the vessel.

My cover may of course be employed with any vessel or utensil in which a liquid is to be heated, and it is not necessarily confined to a saucepan or cooking utensil. The part $l$ which depends into the vessel need not be a continuous flange. Indeed in Fig. 4 the flange is mutilated. The requisites are that a portion of the supporting-flange shall be elevated above the top of the vessel when the cover is in place thereon, so that a space $n$ will be formed thereat, which is open to the interior of the closed vessel at all times.

Having thus described my invention, I claim—

1. A cover for a vessel, having a projecting supporting-flange to rest on the top of the vessel and a pendent portion adapted to extend down into the vessel when the cover is in place, a part of the supporting-flange being elevated above the main portion thereof, whereby a space, which is open to the interior of the vessel, is formed between the said elevated portion of the flange and the top of the vessel, substantially as and for the purposes set forth.

2. A cover for a vessel, having a projecting supporting-flange $i$, and a pendent flange $l$, said supporting-flange having an elevated portion $h$, and said pendent flange having in it one or more apertures situated under the elevated portion of the supporting-flange and adjacent thereto, whereby, when the cover is in place a space $n$ is formed which is open to the interior of the closed vessel, substantially as set forth.

3. The combination with a vessel having a plain rim or top about its mouth, of a cover, having a projecting supporting-flange which rests on the said top of the vessel when the cover is in place thereon, and a pendent portion which extends down into the vessel, a portion of said supporting-flange being elevated above the top of the vessel and thus forming a space $n$, always open to the interior of the vessel when the cover is in place, substantially as and for the purpose set forth.

In witness whereof I have hereunto signed my name in the presence of two subscribing witnesses.

RICHARD CLAYTON.

Witnesses:
STEPHEN WATKINS,
ROBERT M. LISTER.